United States Patent
Kuczaj

(10) Patent No.: US 8,796,875 B2
(45) Date of Patent: Aug. 5, 2014

(54) HOUSING APPARATUS FOR USE WITH AN ELECTRICAL SYSTEM AND METHOD OF USING SAME

(71) Applicant: TurboGen, LLC, Reno, NV (US)

(72) Inventor: John Kuczaj, Reno, NV (US)

(73) Assignee: TurboGen, LLC, Reno, NV (US)

( * ) Notice: Subject to any disclaimer, the term of this patent is extended or adjusted under 35 U.S.C. 154(b) by 0 days.

(21) Appl. No.: 13/682,357

(22) Filed: Nov. 20, 2012

(65) Prior Publication Data
US 2014/0138951 A1 May 22, 2014

(51) Int. Cl.
H02K 16/02 (2006.01)

(52) U.S. Cl.
USPC .......................................................... 290/52

(58) Field of Classification Search
USPC .............................................. 290/52; 310/54
See application file for complete search history.

(56) References Cited

U.S. PATENT DOCUMENTS

| | | | |
|---|---|---|---|
| 2,850,876 A | 9/1958 | Wood | |
| 4,171,938 A | 10/1979 | Pahl | |
| 4,421,998 A | 12/1983 | Ahner et al. | |
| 4,590,820 A | 5/1986 | Hambric | |
| 4,626,114 A | 12/1986 | Phillips | |
| 4,679,661 A | 7/1987 | Gibson | |
| 5,027,024 A | 6/1991 | Slayton | |
| 5,133,122 A | 7/1992 | Kawasaki et al. | |
| 5,365,133 A * | 11/1994 | Raad | 310/68 D |
| 5,544,484 A | 8/1996 | Voss et al. | |
| 5,896,895 A | 4/1999 | Simpkin | |
| 6,040,647 A | 3/2000 | Brown et al. | |
| 6,062,835 A | 5/2000 | Acharya et al. | |
| 6,127,763 A | 10/2000 | Nakamura et al. | |
| 6,132,194 A | 10/2000 | Wenker et al. | |
| 6,531,802 B2 | 3/2003 | Umeda | |
| 6,700,296 B1 | 3/2004 | Oohashi et al. | |
| 6,726,443 B2 | 4/2004 | Collins et al. | |
| 6,750,572 B2 * | 6/2004 | Tornquist et al. | 310/54 |
| 6,763,812 B2 | 7/2004 | Wheeler, Jr. et al. | |
| 6,859,992 B2 | 3/2005 | Gubbels | |
| 6,867,530 B2 | 3/2005 | Gamm et al. | |
| 6,989,622 B1 | 1/2006 | Chen et al. | |
| 7,201,622 B2 | 4/2007 | Hoi | |
| 7,239,062 B2 | 7/2007 | Vacheron et al. | |
| 7,449,794 B2 | 11/2008 | Guey et al. | |
| 7,476,994 B2 * | 1/2009 | Birdi et al. | 310/61 |

(Continued)

OTHER PUBLICATIONS

US 8,063,521, 11/2011, Huynh (withdrawn)

*Primary Examiner* — Tho D Ta
(74) *Attorney, Agent, or Firm* — Manita Rawat; Duane Morris LLP

(57) ABSTRACT

A housing apparatus for use with an electrical system generally comprises a cover assembly that includes a front end, an aft end, and a cavity defined therebetween to enable the cover assembly to house the electrical system within the cavity. At least one electrode plate is coupled to the cover assembly, wherein the electrode plate is configured to provide an electrostatic fluid flow. At least one annular sleeve is coupled to the cover assembly and to the electrode plate. The annular sleeve includes an inner portion and an outer portion. The annular sleeve also includes a plurality of channels and a plurality of cooling structures that extend from the outer portion to the inner portion to facilitate channeling the electrostatic fluid flow within at least a portion of the housing apparatus to prevent a temperature of the housing apparatus and/or the electrical system from substantially increasing.

20 Claims, 7 Drawing Sheets

(56) References Cited

U.S. PATENT DOCUMENTS

| | | |
|---|---|---|
| 7,538,461 B2 | 5/2009 | McMillan et al. |
| 7,714,479 B2 | 5/2010 | Seneff et al. |
| 7,854,265 B2 | 12/2010 | Zimmermann |
| 7,948,105 B2 | 5/2011 | Agrawal et al. |
| 8,008,822 B2 | 8/2011 | Hopewell et al. |
| 8,069,552 B2 | 12/2011 | Yamashita |
| 8,118,570 B2 | 2/2012 | Meacham et al. |
| 8,148,860 B2 | 4/2012 | Wong et al. |
| 8,384,232 B2 | 2/2013 | Myers et al. |
| 8,395,288 B2 | 3/2013 | Huynh |
| 2004/0175277 A1 | 9/2004 | Cox et al. |
| 2006/0131978 A1 | 6/2006 | Hirzel et al. |
| 2009/0151934 A1 | 6/2009 | Heidecke et al. |
| 2010/0084938 A1 | 4/2010 | Palmer et al. |
| 2011/0049894 A1 | 3/2011 | Green |
| 2012/0045352 A1 | 2/2012 | Lawyer et al. |

\* cited by examiner

HOUSING APPARATUS FOR USE WITH AN ELECTRICAL SYSTEM AND METHOD OF USING SAME

BACKGROUND

The field of the invention relates generally to power systems and, more particularly, to a housing apparatus that may be used with an electrical system of the power system.

At least some known systems, such as power systems, use at least one turbine engine that is coupled to a load, wherein the load is an electrical system, such as an electrical generator or inverter. The turbine engine generates mechanical rotational energy and the generator converts the mechanical energy to electrical energy. Some power systems may use high speed generators to facilitate an increased power density. However, when using high speed generators, relatively high rotational speeds are implemented by the rotating element, such as a rotor shaft, of the generator. Such speeds may apply centrifugal forces on the rotating element and result in a relatively high temperature within the generator. The heat may cause stress on the components of the generator.

At least some known housings may be used to house high speed generators. However, the materials used to fabricate at least some known housings may be substantially heavy and/or the rigidity of the materials may be substantially low. Moreover, because the generator is enclosed within the housing, the heat generated by the generator is not able to dissipate. The heat and the relatively low rigidity of the housing may cause deformities to the housing and/or to the generator. A deformed housing and/or generator may cause misalignment of the housing and/or the components of the generator with respect to the turbine engine. Such misalignment may lead to a failure of at least one component of the power system and/or adversely affect the operation of the power system. Accordingly, there is a need for a lightweight and rigid housing structure for high speed generators that facilitates a cooling mechanism to prevent the temperature of the housing and/or of the generator contained therein from substantially increasing.

BRIEF DESCRIPTION

In one embodiment, a housing apparatus for use with an electrical system is provided. The housing apparatus generally comprises a cover assembly that includes a front end, an aft end, and a cavity defined therebetween to enable the cover assembly to house the electrical system within the cavity. At least one electrode plate is coupled to the cover assembly, wherein the electrode plate is configured to provide an electrostatic fluid flow. At least one annular sleeve is coupled to the cover assembly and to the electrode plate. The annular sleeve includes an inner portion and an outer portion. The annular sleeve also includes a plurality of channels and a plurality of cooling structures that extend from the outer portion to the inner portion to facilitate channeling the electrostatic fluid flow within at least a portion of the housing apparatus to prevent a temperature of the housing apparatus and/or the electrical system positioned within the cavity from substantially increasing.

In another embodiment, a power system is provided. The power system generally comprises at least one turbine engine, an electrical system coupled to the turbine engine, and a housing apparatus configured to enclose the electrical system therein. The housing apparatus generally comprises a cover assembly that includes a front end, an aft end, and a cavity defined therebetween to enable the cover assembly to house the electrical system within the cavity. At least one electrode plate is coupled to the cover assembly, wherein the electrode plate is configured to provide an electrostatic fluid flow. At least one annular sleeve is coupled to the cover assembly and to the electrode plate. The annular sleeve includes an inner portion and an outer portion. The annular sleeve also includes a plurality of channels and a plurality of cooling structures that extend from the outer portion to the inner portion to facilitate channeling the electrostatic fluid flow within at least a portion of the housing apparatus to prevent a temperature of the housing apparatus and/or the electrical system positioned within the cavity from substantially increasing.

In yet another embodiment, a method of using a housing apparatus with an electrical system is provided. A cover assembly that includes a front end, an aft end, and a cavity defined therebetween is provided to enable the cover assembly to house the electrical system within the cavity. An electrostatic fluid flow is provided with at least one electrode plate that is coupled to the cover assembly. At least one annular sleeve is coupled to the cover assembly and to the electrode plate, wherein the annular sleeve includes an inner portion and an outer portion. The annular sleeve further includes a plurality of channels and a plurality of cooling structures that extend from the outer portion to the inner portion. The electrostatic fluid flow is channeled through the channels and through the cooling structures to prevent a temperature of the housing apparatus and/or the electrical system positioned within the cavity from substantially increasing.

DETAILED DESCRIPTION

The exemplary apparatus, systems, and methods described herein provide a substantially rigid and lightweight housing apparatus that may be used to house electrical systems, such as high speed generators, wherein the housing apparatus prevents the temperature of the housing apparatus and/or the electrical system contained therein from substantially increasing. The housing apparatus generally comprises a cover assembly fabricated from substantially lightweight, rigid, and heat conductive materials. Moreover, at least one electrode plate is coupled to the cover assembly, wherein the electrode plate is configured to provide an electrostatic fluid flow. At least one annular sleeve is coupled to the cover assembly and to the electrode plate, wherein the annular sleeve includes a plurality of channels and a plurality of cooling structures that facilitate channeling the electrostatic fluid flow within at least a portion of the housing apparatus to prevent a temperature of the housing apparatus and/or the electrical system contained therein from substantially increasing.

Figure 1:
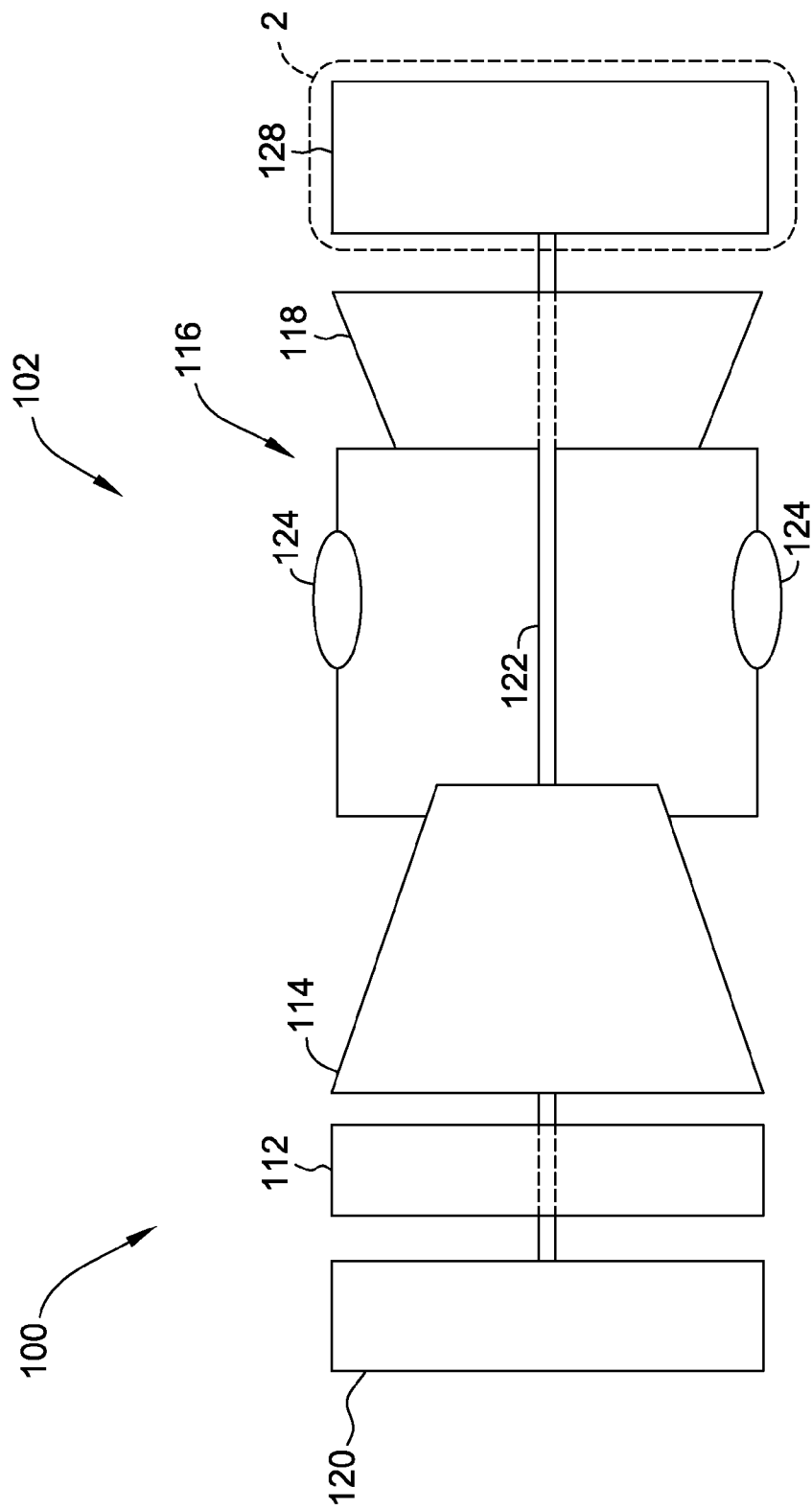
FIG. 1 is a block diagram of an exemplary power system.

FIG. 1 illustrates an exemplary power system 100. Although the exemplary embodiment illustrates a power system, the present disclosure is not limited to power systems, and one of ordinary skill in the art will appreciate that the current disclosure may be used in connection with any type of system. In the exemplary embodiment, the power system 100 includes a turbine engine 102. More specifically, in the exemplary embodiment, the turbine engine 102 is a gas turbine engine. While the exemplary embodiment includes a gas turbine engine, the present invention is not limited to any one particular engine, and one of ordinary skill in the art will appreciate that the current disclosure may be used in connection with other engines.

Moreover, in the exemplary embodiment, the turbine engine 102 includes an intake section 112, a compressor section 114 coupled downstream from the intake section 112, a combustor section 116 coupled downstream from the compressor section 114, a turbine section 118 coupled downstream from the combustor section 116, and an exhaust section 120. It should be noted that, as used herein, the term "couple" is not limited to a direct mechanical, thermal, communication, and/or an electrical connection between components, but may also include an indirect mechanical, thermal, communication and/or electrical connection between multiple components.

The turbine section 118, in the exemplary embodiment, is coupled to the compressor section 114 via a rotor shaft 122. In the exemplary embodiment, the combustor section 116 includes a plurality of combustors 124. The combustor section 116 is coupled to the compressor section 114 such that each combustor 124 is positioned in flow communication with the compressor section 114. The turbine section 118 is coupled to the compressor section 114 and to at least one load (not shown) via the rotor shaft 122. More specifically, the load may include a rotor assembly (not shown) that includes a rotor shaft (not shown) that is coupled to the rotor shaft 122 of the turbine engine 102. The rotor shaft and/or the rotor assembly of the load may be the rotor shaft and/or the rotor assembly described in co-pending U.S. patent application Ser. No. 13/682,378 entitled ROTOR ASSEMBLY AND METHOD OF USING SAME filed Nov. 20, 2012, which is incorporated herein by reference in its entirety. In the exemplary embodiment, the load may be an electrical system, such as a high speed electrical generator or inverter. The load, along with the rotor shaft and/or the rotor assembly, may also be a part of a load apparatus (not shown), which may be the load apparatus that is described in co-pending U.S. patent application Ser. No. 13/682,313 entitled LOAD APPARATUS AND METHOD OF USING SAME, filed Nov. 20, 2012, which is incorporated herein by reference in its entirety. Further, in the exemplary embodiment, a substantially lightweight and rigid housing apparatus 128 substantially encloses at least a portion of the load. More specifically, the housing apparatus encloses the load such that at least a portion of the load's rotor shaft is visible and able to connect with the rotor shaft 122 of the turbine engine. In the exemplary embodiment, the compressor section 114 and the turbine section 118 includes at least one rotor disk assembly (not shown) that is coupled to the rotor shaft 122.

During operation, the intake section 112 channels air towards the compressor section 114 wherein the air is compressed to a higher pressure and temperature prior to being discharged towards the combustor section 116. The compressed air is mixed with fuel and other fluids and ignited to generate combustion gases that are channeled towards the turbine section 118. More specifically, fuel, such as natural gas and/or fuel oil, air, diluents, and/or Nitrogen gas ($N_2$), is injected into combustors 124, and into the air flow. The blended mixtures are ignited to generate high temperature combustion gases that are channeled towards the turbine section 118. The turbine section 118 converts the thermal energy from the gas stream to mechanical rotational energy, as the combustion gases impart rotational energy to the turbine section 118 and to the rotor disk assembly. The mechanical rotational energy is converted to electrical energy via the load.

Due to the high temperature gases and/or the centrifugal forces on the rotating element, such as the rotor shaft of the load, thermal and/or mechanical stress may be applied on the components of the load and/or the power system 100. As described in more detail below, to prevent such damage, the substantially lightweight and rigid housing apparatus 128 prevents the temperature of the housing apparatus 128 and/or the load contained therein from substantially increasing.

Figure 2:
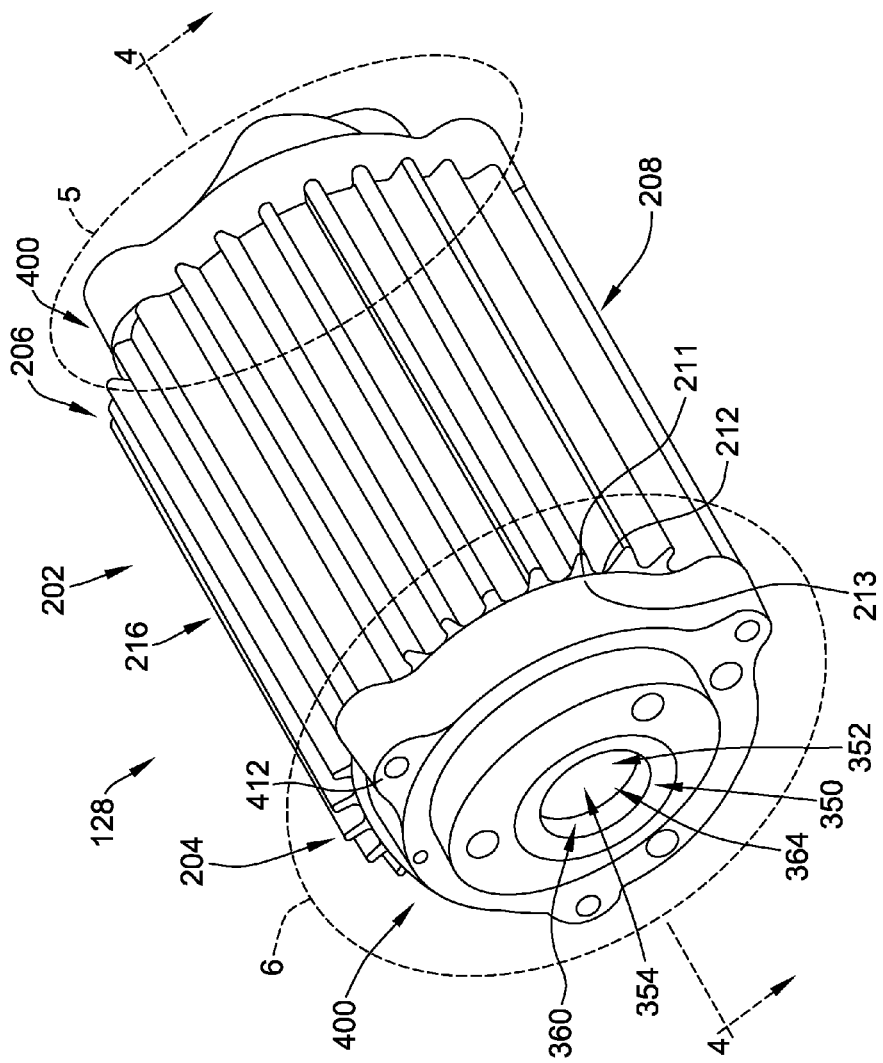
FIG. 2 is a perspective view of an exemplary housing apparatus that may be used in the power system shown in FIG. 1 and taken from area 2.
Figure 3:
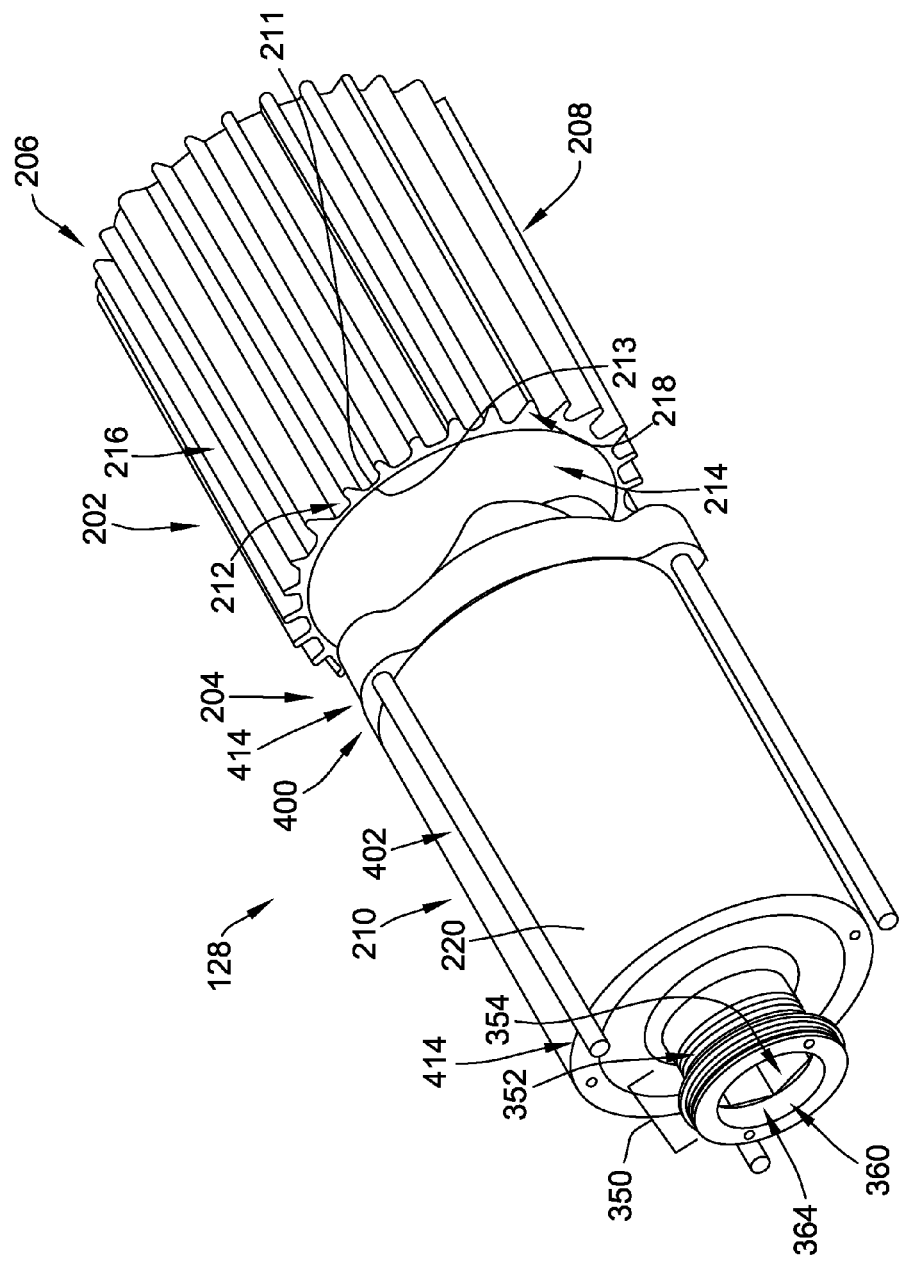
FIG. 3 is a partially exploded perspective view of the housing apparatus shown in FIG. 2.
Figure 4:
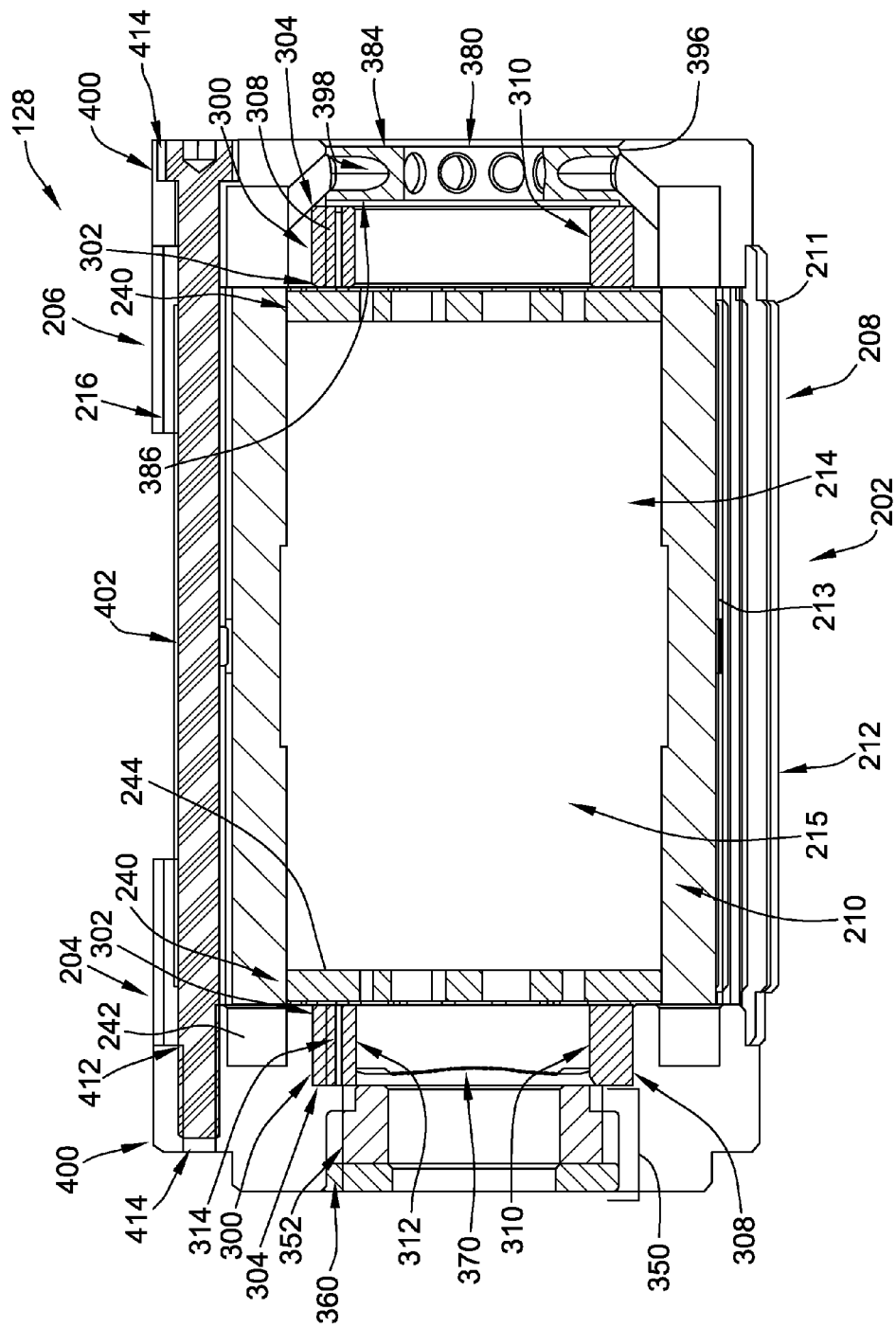
FIG. 4 is a cross-sectional view of the housing apparatus shown in FIG. 2 and taken along line 4-4.
Figure 5:
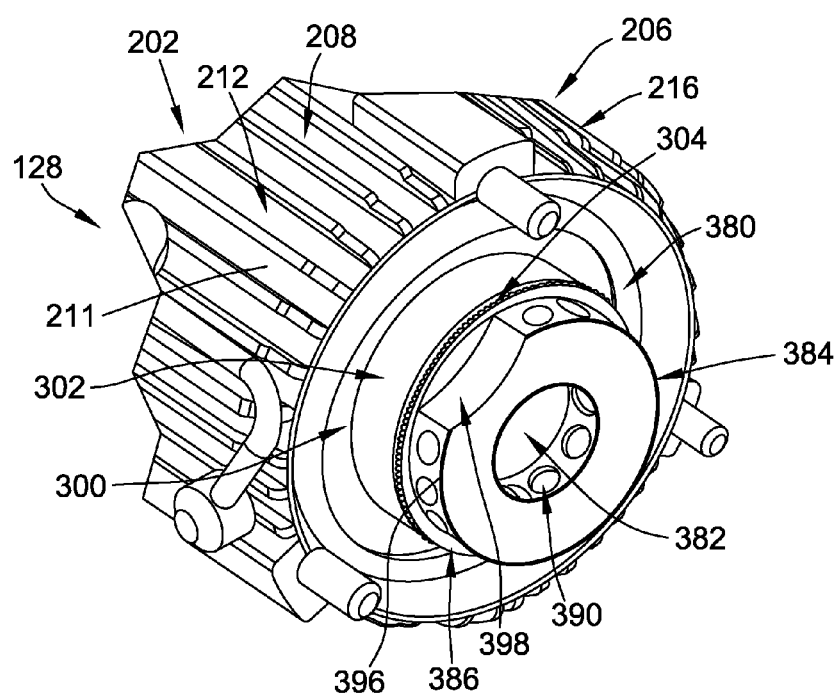
FIG. 5 is a perspective view of a portion of the housing apparatus shown in FIG. 2 and taken from area 5.
Figure 6:
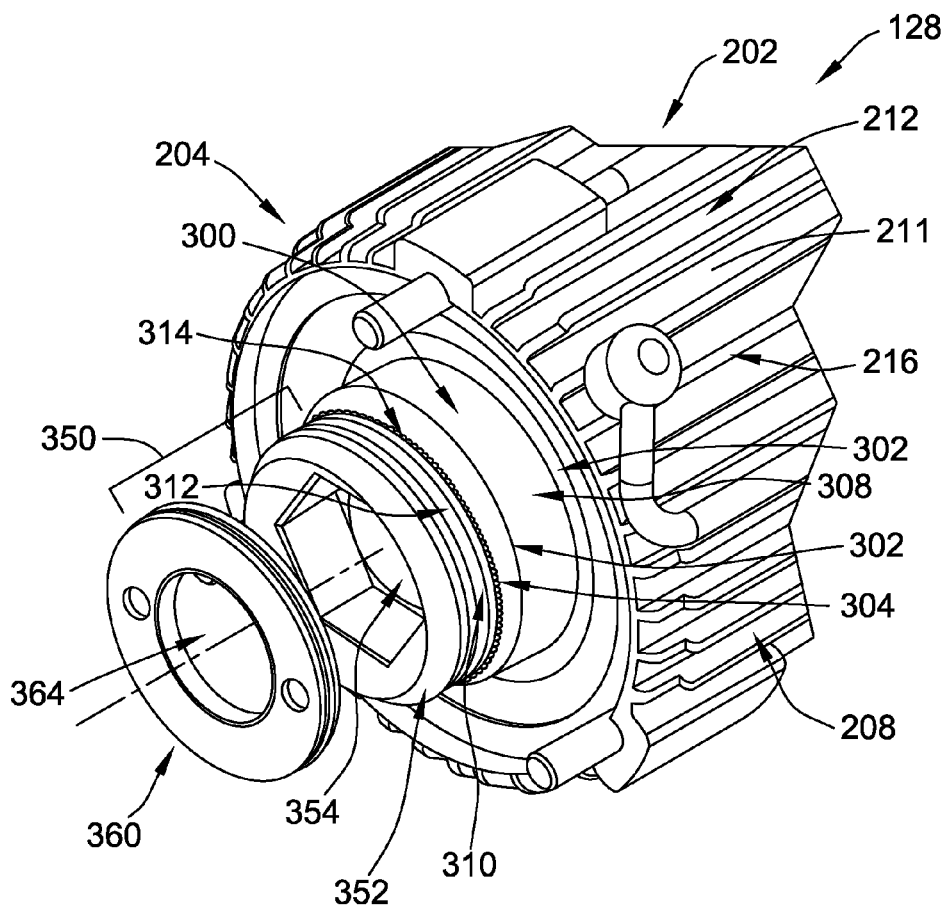
FIG. 6 is a partially exploded perspective view of a portion of the housing apparatus shown in FIG. 2 and taken from area 6.
Figure 7:
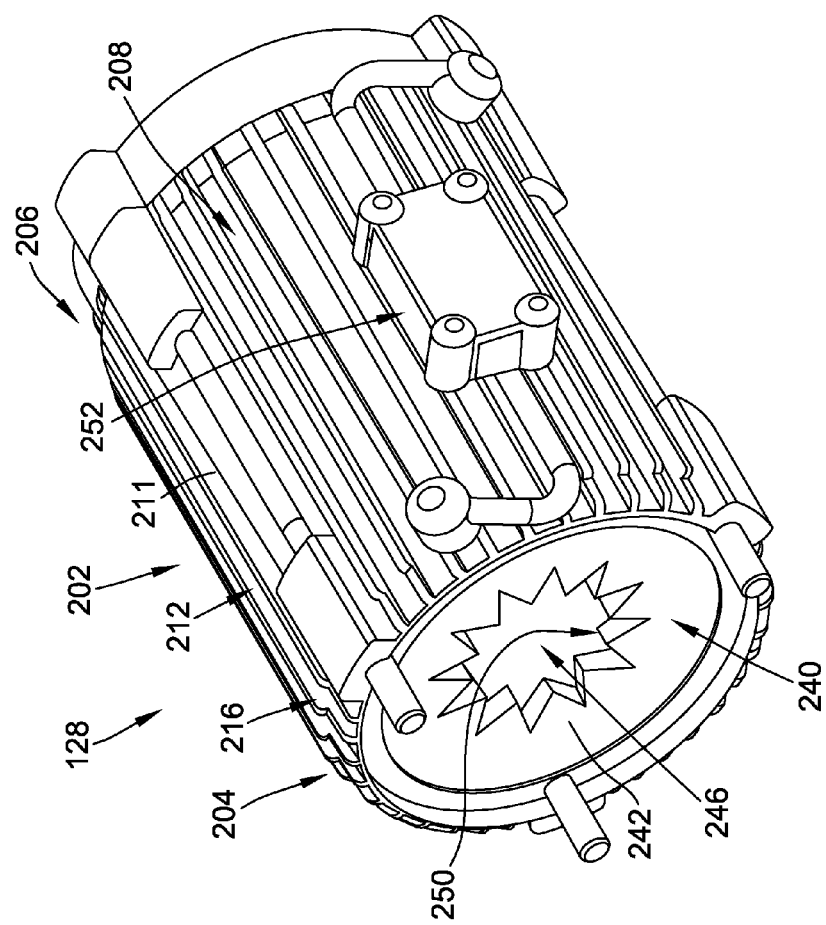
FIG. 7 is a perspective view of a portion of the housing apparatus shown in FIG. 2.

FIG. 2 is a perspective view of the housing apparatus 128 taken from area 2 (shown in FIG. 1). FIG. 3 is a partially exploded perspective view of the housing apparatus 128. FIG. 4 is a cross-sectional view of the housing apparatus 128 taken along line 4-4 (shown in FIG. 2). FIG. 5 is a perspective view of a portion of the housing apparatus 128 taken from area 5 (shown in FIG. 2). FIG. 6 is a partially exploded perspective view of a portion of the housing apparatus 128 taken from area 6 (shown in FIG. 2). FIG. 7 is perspective view of a portion of the housing apparatus 128.

Referring to FIGS. 2 and 3, the housing apparatus 128 includes a cover assembly 202 that includes a front end 204 and an aft end 206, wherein the front end 204 is positioned adjacent to a portion of the rotor shaft 122 (shown in FIG. 1). The cover assembly 202, in the exemplary embodiment, includes an exterior cover 208 that substantially circumscribe an inner cover 210. In the exemplary embodiment, the exterior cover 208 can be coupled to the inner cover 210 using a variety of manufacturing processes known in the art, such as, but not limited to, molding process, drawing process, or a machining process. For example, the exterior cover 208 may be coupled to the inner cover 210 using adhesive bonding or heating/welding methods. More specifically, the exterior cover 208 includes a substantially cylindrical base portion 212 that includes an outer portion 211 and an opposing inner portion 213 that defines a cavity 214 such that inner cover 210 can be positioned within the cavity 214. The exterior cover 208 also includes a plurality of cooling fins 216 that each extend radially outwardly from the outer portion 211 of the base portion 214. Each cooling fin 216 includes a channel 218 defined therein that extends laterally from the front end 204 of the cover assembly 202 to the aft end 206 of the cover assembly such that fluid, such as air, can be channeled therethrough. In the exemplary embodiment, the base portion 212 and the cooling fins 216 may be integrally formed together such that the exterior cover 208 is a single component. Further, in the exemplary embodiment, the exterior cover 208 is at least partially formed from lightweight and heat conductive materials, such as copper, aluminum, a metal matrix composite, and/or silicon carbide. Alternatively, the exterior cover 208 may be formed from any suitable material that enables the housing apparatus 128 and/or the power system 100 (shown in FIG. 1) to function as described herein.

The inner cover 210 is substantially cylindrical and includes a cavity 215 such that the at least a portion of the load may be positioned therein. More specifically, the load may be positioned within the cavity 215 such that at least a portion of the rotor shaft (not shown) of the load may extend through the cavity 215 from the front end 204 of the cover assembly 202. As such, the rotor shaft is visible and can be coupled to the rotor shaft 122 of the turbine engine 102. An exterior surface 220 of the inner cover 210 is substantially planar in the exemplary embodiment. The inner cover 210 is at least partially formed from a lightweight and heat conductive material. For example, the inner cover 210 may be formed from a metal matrix composite material that is substantially rigid. The metal matrix composite material may include a first metal material and at least one other material, such as a second metal material and/or a ceramic compound. Alternatively, the inner cover 210 may be formed of any suitable material that enables the housing apparatus 128 and/or the power system 100 to function as described herein. The exterior cover 208 and the inner cover may be formed from similar materials or, alternatively, the materials for each may be different. For example, the exterior cover 208 may also be formed of the same metal matrix composite material as the inner cover 210.

Referring to FIGS. 4 and 7, at least one electrode plate 240 is coupled to the cover assembly 202. More specifically, in the exemplary embodiment, one electrode plate 240 is coupled to the front end 204 of the cover assembly 202 and one electrode plate 240 is coupled to the aft end 206 of the cover assembly 202. While the exemplary embodiment includes two electrode plates 240, the housing apparatus 128 may have any suitable number of electrode plates 240 that enable the housing apparatus 128 and/or the power system 100 to function as described herein.

In the exemplary embodiment, each electrode plate 240 is an electrical conductor that is configured to provide an electrostatic fluid flow, such as an electrostatic air flow within the housing apparatus 128. Each electrode plate 240 has a planar exterior surface 242 and a planar interior surface 244 that is positioned adjacent to the cover assembly 202. An opening 246 is defined within each plate 240, wherein the opening 246 extends from the exterior surface 242 through the interior surface 244. The portion of each plate 240 that defines the opening 246 has a plurality of projections 250, wherein each projection 250 has a substantially saw tooth shape. The projections 250 enable each plate 240 to generate a concentrated electron stream that causes fluid flow augmentation through aerodynamic drag.

The electrode plates 240 are powered with a power supply 252 that is mounted on the cover assembly 202 and is coupled to each electrode plate 240. More specifically, the power supply 252 is mounted on the outer portion 211 of the exterior cover 208. In the exemplary embodiment, the power supply 252 is a high-voltage power supply in the range of approximately 20,000 Volts to approximately 35,000 Volts. Alternatively, power supply 252 may be any suitable type of power supply 252 that enables the housing apparatus 128 and/or the power system 100 to function as described herein.

Referring to FIGS. 4 and 6, the housing apparatus 128 includes at least one annular sleeve 300 that is coupled to the cover assembly 202. More specifically, in the exemplary embodiment, each annular sleeve 300 includes an inner portion 302 and an outer portion 304, wherein the inner portion 302 of one annular sleeve 300 is positioned against the front end 204 of the cover assembly 202 and the exterior surface 242 of one electrode plate 240, and the inner portion 302 of another annular sleeve 300 is positioned against the aft end 206 of the cover assembly 202 and the exterior surface 242 of the other electrode plate 240. While two sleeves 300 are illustrated in the exemplary embodiment, the housing apparatus 128 may include any number of sleeves that enable the housing apparatus 128 and/or the power system 100 to function as described herein.

In the exemplary embodiment, each sleeve 300 includes an outer ring portion 308 that substantially circumscribes an inner ring portion 310, wherein the outer ring portion 308 and the inner ring portion 310 are integrally formed together. The inner ring portion 310 substantially circumscribes a bearing, such as the rotor shaft of the load. A plurality of cooling structures 312 are positioned between the outer ring portion 308 and the inner ring portion 310, wherein each structure 312 extends from the outer portion 304 of the sleeve 300 to the inner portion 302 of the sleeve 300. The cooling structures 312 are lattice structures that are at least partially formed from metallic materials, ceramic materials, and/or organic polymers, such as plastic. Each sleeve 300 also includes a plurality of channels 314 that are defined between the cooling structures 312, wherein each channel 314 also extends from the outer portion 304 of the sleeve 300 to the inner portion 302 of the sleeve. The cooling structures 312 and the channels 314 are configured to facilitate channeling electrostatic fluid flow within at least a portion of the housing apparatus 128.

As illustrated in FIGS. 2, 3, 4, and 6, a fastener assembly 350 is coupled the sleeve 300 that is positioned adjacent to the front end 204 of the cover assembly 202. In the exemplary embodiment, the fastener assembly 350 includes a fastener 352 that is coupled to and positioned against the outer portion 304 of the sleeve 300. In the exemplary embodiment, the fastener 352 is a threaded bolt that substantially circumscribes at least a portion of the load's rotor shaft. More specifically, the fastener 352 has an opening 354 defined therein such that at least a portion of the rotor shaft may extend through the opening 354. An adaptor plate 360 is coupled to and positioned against the fastener 353. In the exemplary embodiment, the adaptor plate 360 has an opening 364 that is concentrically aligned with the opening 354 of the fastener 352 such that at least a portion of the load's rotor shaft may extend through both openings 354 and 364 to enable the rotor shaft to couple with the rotor shaft 122 of the turbine engine 102.

In the exemplary embodiment, the fastener assembly 350 also includes a spring 370 (shown in FIG. 4) that is coupled to the fastener 352 and extends into the inner ring portion 310 of the sleeve 300. The fastener assembly 350, in the exemplary embodiment, facilitates positioning a bearing within the sleeve 300. More specifically, each of the fastener 353, adaptor plate 360, and the spring 370 provides a substantially accurate cartridge bearing pre-load force. The pre-load force helps the rotor and/or other components of the load remain stable within the sleeve 300 and within the housing apparatus 128 by substantially reducing rolling element skidding. Pre-load condition can be confirmed by using, for example, a force gage transducer (not show).

As illustrated in FIGS. 4 and 5, the housing apparatus 128 includes a flow control device 380 that is coupled to the sleeve 300 that is coupled to the aft end 206 of the cover assembly 202. More specifically, in the exemplary embodiment, the flow control device 380 includes an opening 382 defined therein that extends from an exterior portion 384 to an interior portion 386 of the flow control device 380, wherein the interior portion 386 is positioned against the outer portion 304 of the sleeve 300. At least a portion of an end portion of the load's rotor shaft may be coupled to the flow control device 380 such that the end portion of the rotor shaft is positioned within the opening 382. A plurality of channels 390 extend radially outwardly from the opening 382 to an exterior surface 392 of the flow control device 380. An outer surface 396 of the flow control device 380 includes a plurality of passages 398. The flow control device 380 is configured to rotate in either a clockwise or counterclockwise direction to channel fluid, such as air, through at least a portion of the housing apparatus 128. For example, the air may flow through the channels 390 and the exterior passages 398.

Referring to FIGS. 2, 3, and 4, the housing apparatus 128 includes at least one cap member 400 that is coupled to the cover assembly 202. More specifically, in the exemplary embodiment, one cap member 400 is coupled to the front end 204 of the cover assembly 202 and one cap member 400 is coupled to the aft end 206 of the cover assembly 202. The cap member 400 on the front end 204 substantially circumscribes at least a portion of the sleeve 300 and the fastener assembly 350. The cap member 400 on the aft end 206 substantially circumscribes at least a portion of the sleeve 300 and the flow control device 380.

Each cap member 400 is securely coupled to the cover assembly 202 by using a plurality of substantially cylindrical rods 402. More specifically, each cap member 400 includes a plurality of openings 412 that are each configured to receive at least an end portion 414 of one rod 402. For example, each opening 412 on the cap member 400 positioned on the front end 204 of the cover assembly 202 is concentrically aligned with an opening 412 on the cap member 400 positioned on the aft end 206 of the cover assembly 202. As such, one end portion 414 of one rod 402 may be positioned within one opening 214 and the other end portion 416 of the same rod 402 may be positioned within an opening 214 on the other cap member 400 such that the rod 402 extends along the exterior surface 220 of the inner cover 210 of the cap assembly 202. In the exemplary embodiment, three rods 402 are used. Alternatively, any number of rods 402 that enable housing apparatus 128 and/or power system to function as described herein may be used. Moreover, the end portions 414 of the rods 402 may have substantially different shapes based on where the end portion 414 is located. For example, the end portion 414 on the front end 204 of the cover assembly 202 may be substantially cylindrical and the end portion 414 on the aft end 206 of the cover assembly 202 may be substantially threaded. Each opening 412 is sized to receive the various shapes of the corresponding end portions 414.

During operation, the turbine section 118 (shown in FIG. 1) converts the thermal energy from the gas stream to mechanical rotational energy, as the combustion gases impart rotational energy to the turbine section 118 and to a rotor disk assembly (not shown). The mechanical rotational energy is then converted to electrical energy via the load. Due to the high temperature gases and/or the centrifugal forces on the rotating elements, such as on the rotor of the load, thermal and/or mechanical stress may be applied on the components of the load and/or the power system 100. The housing apparatus 128 prevents the temperature of the housing apparatus 128 and/or the load contained therein from substantially increasing.

In the exemplary embodiment, as the rotor shaft 122 in the turbine engine 102 rotates, the rotor shaft within the load rotates. As the rotor shaft within the load rotates, the rotational motion imparts a rotational force on the flow control device 380. As the flow control device 380 rotates, cooling air is generated and channeled through the channels 390 and through the passages 398 of the flow control device 380. The air is channeled within the cap member 400 and circulated such that the cooling air then flows past the electrode plate 240 on the aft end 206 of the cover assembly 202 such that the air flow can be electrostatically charged. Moreover, as the air flows through the electrode plate 240, the projections 250 of the plate 240 to generate a concentrated electron stream that causes air flow augmentation through aerodynamic drag. The electrostatically charged air then flows through the cooling structures 312 and the channels 314 of the sleeve 300. The air is then channeled through the cover assembly 202, wherein the air can be flow through the cooling fins 216. The channeled air facilitates preventing the temperature of at least a portion of the housing apparatus and/or of the load therein from substantially increasing.

As air is channeled to the front end 204 of the cover assembly 202, the air passes through the sleeve 300 and the electrode plate 240 on the front end 204, to continue to prevent the temperature of the housing apparatus 128 and/or of the load contained therein from substantially increasing. Moreover, the temperature of the portion of the load's rotor shaft that extends through the front end 204 may be prevented from increasing as well.

As compared to known housing structures that are used for electrical systems, such as high speed generators, the embodiments described herein provides a substantially rigid and light weight housing apparatus that facilitates preventing the temperature of the housing apparatus and/or the electrical system contained therein from substantially increasing. The housing apparatus generally comprises a cover assembly fabricated from substantially lightweight, rigid, and heat conductive materials. Moreover, at least one electrode plate is coupled to the cover assembly, wherein the electrode plate is configured to provide an electrostatic fluid flow. At least one annular sleeve is coupled to the cover assembly and to the electrode plate, wherein the annular sleeve includes a plurality of channels and a plurality of cooling structures that facilitate channeling the electrostatic fluid flow within at least a portion of the housing apparatus to prevent a temperature of the housing apparatus and/or the electrical system contained therein from substantially increasing.

Exemplary embodiments of systems, apparatus, and methods are described above in detail. The systems, apparatus, and methods are not limited to the specific embodiments described herein, but rather, components of each system, apparatus, and/or method may be utilized independently and separately from other components described herein. For example, each system may also be used in combination with other systems and is not limited to practice with only systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A housing apparatus for use with and electrical system comprising:

a cover assembly comprising a front end, an aft end, and a cavity defined therebetween to enable said cover assembly to house the electrical system within said cavity;

at least one electrode plate coupled to said cover assembly, wherein said at least one electrode plate comprises a portion that defines an opening that extends through said at least one electrode plate and said portion comprises a plurality of projections such that said at least one electrode plate is configured to provide an electrostatic fluid flow; and at least one annular sleeve coupled to said cover assembly and to said at least one electrode plate, wherein said at least one annular sleeve comprises an inner portion and an outer portion, said at least one annular sleeve further comprises a plurality of channels and a plurality of cooling structures that extend from said outer portion to said inner portion to facilitate channeling the electrostatic fluid flow within at least a portion of said housing apparatus to prevent a temperature of at least one of said housing apparatus and the electrical system positioned within said cavity from substantially increasing.

2. A housing apparatus in accordance with claim 1, further comprising a cap member that substantially circumscribes said at least one annular sleeve.

3. A housing apparatus in accordance with claim 1, wherein said cover assembly comprises an inner cover that defines said cavity and an exterior cover that substantially circumscribes said inner cover.

4. A housing apparatus in accordance with claim 3, wherein said inner cover is at least partially formed from a metal matrix composite material comprising a first metal material and at least one of a second metal material and a ceramic compound.

5. A housing apparatus in accordance with claim 3, wherein said outer cover is at least partially formed from at least one of copper, aluminum, a metal matrix composite, and silicon carbide.

6. A housing apparatus in accordance with claim 1, wherein said at least one annular sleeve comprises a first annular sleeve and a second annular sleeve, and wherein said at least one electrode plate comprises a first electrode plate and a second electrode plate, said first annular sleeve is coupled to said cover assembly front end and to said first electrode plate and said second annular sleeve is coupled to said cover assembly aft end and to said second electrode plate.

7. A housing apparatus in accordance with claim 6, further comprising a fastener assembly coupled to said first annular sleeve to facilitate positioning a bearing within said first annular sleeve.

8. A housing apparatus in accordance with claim 6, further comprising a flow control device coupled to said second annular sleeve, wherein said flow control device is configured to facilitate channeling the electrostatic fluid flow within at least a portion of said housing apparatus.

9. A power system comprising:
at least one turbine engine;
an electrical system coupled to said at least one turbine engine; and
a housing apparatus configured to enclose said electrical system therein, wherein said housing apparatus comprises:
a cover assembly comprising a front end, an aft end, and a cavity defined therebetween to enable said cover assembly to house said electrical system within said cavity;
at least one electrode plate coupled to said cover assembly, wherein said at least one electrode plate comprises a portion that defines an opening that extends through said at least one electrode plate and said portion comprises a plurality of projections such that said at least one electrode plate is configured to provide an electrostatic fluid flow; and
at least one annular sleeve coupled to said cover assembly and to said at least one electrode plate, wherein said at least one annular sleeve comprises an inner portion and an outer portion, said at least one annular sleeve further comprises a plurality of channels and a plurality of cooling structures that extend from said outer portion to said inner portion to facilitate channeling the electrostatic fluid flow within at least a portion of said housing apparatus to prevent a temperature of at least one of said housing apparatus and said electrical system from substantially increasing.

10. A power system in accordance with claim 9, wherein said housing apparatus further comprises a cap member that substantially circumscribes said at least one annular sleeve.

11. A power system in accordance with claim 9, wherein said cover assembly comprises an inner cover that defines said cavity and an exterior cover that substantially circumscribes said inner cover.

12. A power system in accordance with claim 11, wherein said inner cover is at least partially formed from a metal matrix composite material comprising a first metal material and at least one of a second metal material and a ceramic compound.

13. A power system in accordance with claim 11, wherein said outer cover is at least partially formed from at least one of copper, aluminum, a metal matrix composite, and silicon carbide.

14. A power system in accordance with claim 9, wherein said at least one annular sleeve comprises a first annular sleeve and a second annular sleeve, and wherein said at least one electrode plate comprises a first electrode plate and a second electrode plate, said first annular sleeve is coupled to said cover assembly front end and to said first electrode plate and said second annular sleeve is coupled to said cover assembly aft end and to said second electrode plate.

15. A power system in accordance with claim 14, wherein said housing apparatus further comprises a fastener assembly coupled to said first annular sleeve to facilitate positioning a bearing within said first annular sleeve.

16. A power system in accordance with claim 14, wherein said housing apparatus further comprises a flow control device coupled to said second annular sleeve, wherein said flow control device is configured to facilitate channeling the electrostatic fluid flow within at least a portion of said housing apparatus.

17. A method of using a housing apparatus with an electrical system, said method comprising:
providing a cover assembly that includes a front end, an aft end, and a cavity defined therebetween to enable the cover assembly to house the electrical system within the cavity;
providing an electrostatic fluid flow with at least one electrode plate that is coupled to the cover assembly, wherein the at least one electrode plate includes a portion that defines an opening that extends through the at least one electrode plate and the portion includes a plurality of projections;
coupling at least one annular sleeve to the cover assembly and to the at least one electrode plate, wherein the at least one annular sleeve includes an inner portion and an outer portion, the at least one annular sleeve further includes a plurality of channels and a plurality of cooling structures that extend from the outer portion to the inner portion; and channeling the electrostatic fluid flow through the plurality of channels and through the plurality of cooling structures to prevent a temperature of at least one of the housing apparatus and the electrical system positioned within the cavity from substantially increasing.

18. A method in accordance with claim 17, further comprising coupling a cap member to the at least one annular sleeve such that the cap member substantially circumscribes the at least one annular sleeve.

19. A method in accordance with claim 17, wherein coupling at least one annular sleeve to the cover assembly and to the at least one electrode plate further comprises:

coupling a first annular sleeve to the cover assembly front end and to a first electrode plate; and coupling a second annular sleeve to the cover assembly aft end and to a second electrode plate.

20. A method in accordance with claim 19, further comprising:

coupling a fastener assembly to the first annular sleeve to facilitate positioning a bearing within the first annular sleeve; and coupling a flow control device to the second annular sleeve, wherein the flow control device is configured to facilitate channeling the electrostatic fluid flow within at least a portion of the housing apparatus.

* * * * *

UNITED STATES PATENT AND TRADEMARK OFFICE
CERTIFICATE OF CORRECTION

| | | |
|---|---|---|
| PATENT NO. | : 8,796,875 B2 | Page 1 of 1 |
| APPLICATION NO. | : 13/682357 | |
| DATED | : August 5, 2014 | |
| INVENTOR(S) | : John Kuczaj | |

It is certified that error appears in the above-identified patent and that said Letters Patent is hereby corrected as shown below:

In the Specification:

Column 4, line 35, delete "circumscribe" and insert -- circumscribes -- therefor.

Column 8, line 1, delete "to".

Column 8, line 6, delete "be".

Column 8, line 20, delete "provides" and insert -- provide -- therefor.

In the Claims:

Column 8, Line 66, Claim 1, delete "and" and insert -- an -- therefor.

Signed and Sealed this
Twenty-first Day of October, 2014

Michelle K. Lee
*Deputy Director of the United States Patent and Trademark Office*